May 2, 1933.  R. E. H. CARPENTER ET AL  1,907,415
APPARATUS FOR ANALYSIS AND MEASUREMENT OF NOISE AND OTHER SOUNDS
Filed June 25, 1932
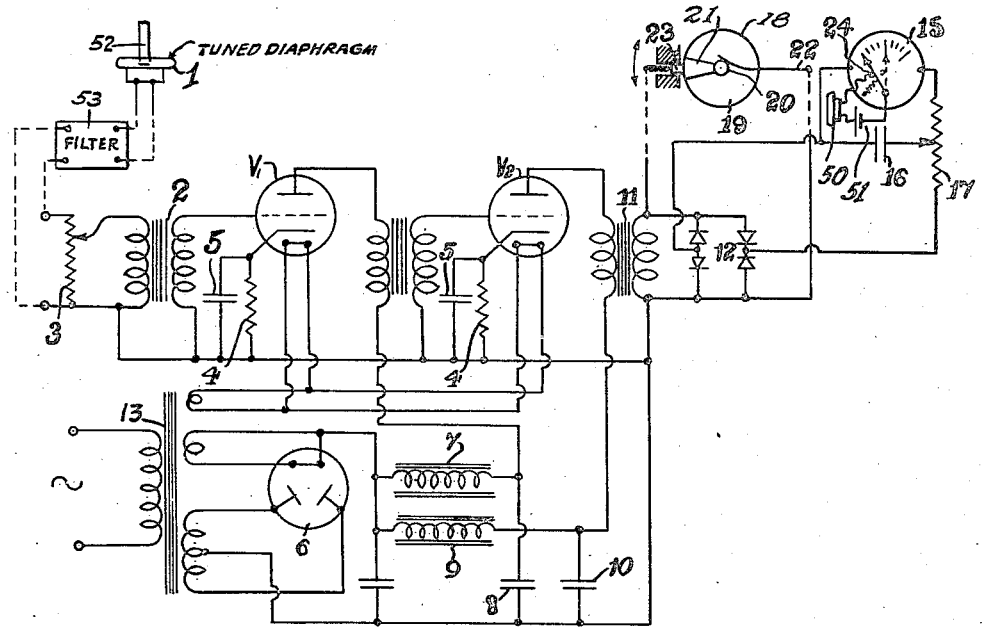
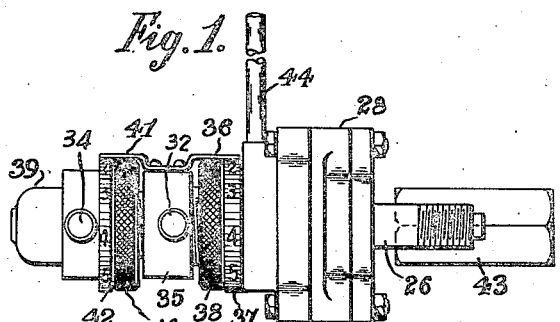
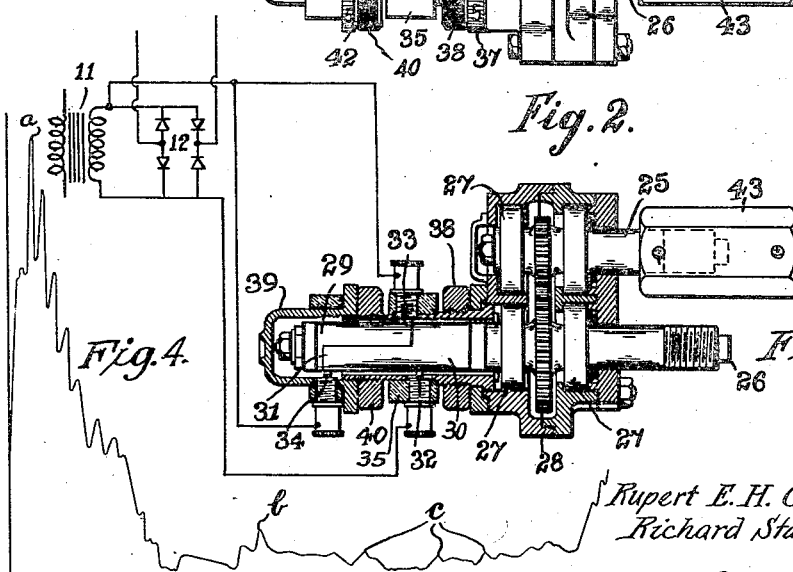
Inventors
Rupert E. H. Carpenter
Richard Stansfield
Eugene C. Brown
Attorney Patented May 2, 1933

1,907,415

UNITED STATES PATENT OFFICE

RUPERT EVAN HOWARD CARPENTER, OF CROYDON, AND RICHARD STANSFIELD, OF TEDDINGTON, ENGLAND

APPARATUS FOR ANALYSIS AND MEASUREMENT OF NOISE AND OTHER SOUNDS

Application filed June 25, 1932, Serial No. 619,334, and in Great Britain June 22, 1931.

This invention relates to means for measuring and analyzing or otherwise investigating noise and other mechanical vibrations produced for example by running machinery. It is particularly adapted for the investigation of mechanical knocking and of pinking due to certain types of combustion in internal combustion engines. It may also be applied to the investigation of mixture distribution and similar problems in multi-cylinder internal combustion engines.

According to the present invention, the noises or other vibrations associated with the running machinery are caused to actuate a visual indicating device only during uniformly spaced time periods or during selected time periods the intervals between which are governed by the speed of rotation of the machinery.

The invention further provides apparatus adapted for use in the method of noise investigation above mentioned. In a preferred form, the apparatus comprises a device (hereinafter referred to for the sake of brevity as a microphone) for converting sounds or other mechanical vibratory energy into electrical variations, an amplifier for amplifying the electrical variations, an indicating device associated with the output of the amplifier and means, adapted to be driven by the machinery to be investigated, for periodically short-circuiting the output of the amplifier.

The invention will be described by way of example with reference to the accompanying drawing, in which Fig. 1 is a diagrammatic illustration of one form of apparatus according to the invention, Figs. 2 and 3 are views in elevation and sectional plan, respectively, of a preferred form of selector device, and Fig. 4 is a graph illustrating certain results which may be obtained with the aid of the present invention.

Referring to Fig. 1, a microphone 1, preferably in the form of an electromagnetic telephone receiver of common form, is connected to the input transformer 2 of an amplifier. A potentiometer 3 is provided to permit control of the intensity of the electrical oscillations impressed upon the transformer 2. A two-stage amplifier of known type is illustrated, the grid bias being of the so-called floating type; that is to say its value is dependent upon the voltage drop along a resistance 4, shunted by a condenser 5, and connected in the space current circuit between the anode and the independently heated cathode of each of the valves $V_1$ and $V_2$. The grid-bias voltage is therefore dependent upon the mean value of the space current.

The heaters for the cathodes of the two valves are energized from one winding of a transformer 13, the primary winding of which is connected to a source of alternating current. The space current for the two valves is derived from a separate winding on the same transformer 5, and is rectified by a valve 6. Separate smoothing circuits 7, 8 and 9, 10 respectively are provided for the two valves.

To the secondary winding of the output transformer 11 are connected two diagonally opposite points of a rectifying unit 12 arranged in the form of a Wheatstone bridge. The rectifiers 12 may be of the dry plate type, such for example as copper-copper oxide rectifiers. The rectifying unit 12 serves to rectify the oscillations from the amplifier and enable a direct current type indicating device to be used. The other two diagonal points of the bridge are connected to an indicating device 15, in the form of a voltmeter, which is shunted by a condenser 16 which may be of the electrolytic type, and one terminal of which is adjustable along a resistance 17 arranged in series with the indicating device.

Across the output of the amplifier (that is to say across the terminals of the secondary winding of the output transformer 11) is connected a selector or short-circuiting device which is indicated diagrammatically at 18. This device comprises a metal disc 19 rotatably mounted upon a spindle 20 and in the disc is a sector 21 of insulating material. Contact is made with the device by means of a brush 22 bearing upon the spindle 20 and by means of a brush 23 bearing upon the periphery of the disc 19. During the greater part of each revolution of the disc 19 the output of the amplifier will be short-circuited and during the portion of the revolution over which the brush 23 bears upon the insulated sector 21 the output will be open circuited and the indicating device will be operative.

In using the apparatus above described, for example in investigating the noises associated with a 4-stroke internal combustion engine, the microphone 1 is fixed in some suitable position close to the engine and the spindle 20 of the short-circuiting device 18 is coupled preferably with the cam shaft of the engine which runs at half engine speed. The brush 23 may be made adjustable around the spindle 20 so that the point in the cycle at which the open circuit condition commences may be adjusted. Thus the noises affecting the microphone 1 will influence the indicating device 15 only during a succession of spaced time periods, each of these time periods corresponding to the same portion of the cycle of the engine. If the engine speed is uniform the periods will be uniformly spaced apart but in any case the spacing will be a function of the speed of rotation of the engine. The length of the time periods during which the indicating device is operative is dependent upon the size of the sector 21 but is usually made small compared with the interval between successive periods so that only the noise associated with one precise portion of the cycle may be investigated at one time.

The indicating device is usually given such mechanical or electrical properties that it can average the signal energy received so that, if the energy delivered during each period remains constant, the needle of the indicating device will be deflected, against the action of a return spring or the like, to a substantially constant extent. In the apparatus illustrated, the electrical damping is made adjustable by means of the contact on the resistance 17. With the aid of this adjustment the product of the resistance and capacity, and therefore the time constant, of the circuit of the indicating device 15 can be given the desired value.

If it be desired to measure peak values of noise instead of average values, the needle stop 24 of the indicating device 15 may be made adjustable and means may be provided for indicating when contact between the needle and the stop is just broken. Such means may, for example, comprise a telephone 50 and a battery 51 connected between the needle and the stop. The condenser 16 and resistance 17 may then be omitted.

It will be clear that since energy is only received by the indicating device over a small fraction of any given time, no energy being received over the remainder of the time, the amplitude of the energy required to produce any given deflection of the indicating needle is proportionately high. For example, supposing that the indicating device is operative over one twentieth of the total time, and inoperative over nineteen twentieths of the time, the amplitude of the energy required to produce a given deflection will be of the order of twenty times the amplitude which will produce the same deflection, when applied continuously. Hence it is necessary that the amplifier shall be so constructed that it can handle, without overloading, a voltage amplitude which is much greater than that which, when maintained, will produce the desired maximum effect upon the indicating device. The way in which an amplifier can be designed to handle any desired voltage swing is well known and will not therefore be described herein.

In some cases it may be desirable to transmit vibrations to the microphone otherwise than through the air, and in such cases it may be convenient to couple the diaphragm mechanically to the member, the vibrations of which are to be studdied. For this purpose a metal or other rod 52 may be fixed to the centre of the diaphragm and the free end of the rod may be brought to bear upon the member.

It is often desired to select certain frequencies out of those associated with a noise for particular investigation and for this purpose frequency selective means may be associated with the apparatus. For example a tuned or other filter circuit 53 may be provided between the microphone and the indicating device. Preferably, however, the microphone itself is provided with a diaphragm so dimensioned and arranged that it exhibits a peak of response at the frequency, or over the band of frequencies, to be selected. This can be done readily by using, as described, an ordinary telephone ear piece, which, in the absence of loading due to the ear cavities, exhibits a pronounced peak in its response. The frequency at which this peak occurs can readily be changed by exchanging the diaphragm for one of a different thickness.

The graph of Fig. 4 is illustrative of measurements of the noise indicated with a high speed Diesel engine. In this graph the readings of the indicating device are plotted as ordinate and the crank angle as abscissa. The periods of the combustion, exhaust, suction and compression strokes are indicated by the letters A, B, C and D respectively. The crank angle over which the amplifier output was open circuited was 15° and therefore each point on the curve at which a measurement was taken represents the noise over 7½° crank angle on either side of the ordinate of the point, averaged over a number of cycles.

The peak $a$ represents the explosion and the succession of peaks to the right of this have been found to represent beats between the free vibratory oscillations of a cylinder relative to the engine crank case and the oscillations of the diaphragm of the microphone at its resonant frequency. When the natural frequency of the microphone diaphragm is changed, the spacing of the peaks changes and from two sets of readings, with different diaphragms, the frequency of the cylinder vibrations can be ascertained.

The peaks at $b$ represent noise associated with the connecting rod bearings during the change of direction of the forces thereon and peaks at $c$ represent piston slap.

The invention is applicable to a great many other investigations. For example when used for the comparison of various fuels from the point of view of their "anti-knock" properties, the incidence of "knocking" can be determined with considerably greater accuracy than heretofore.

The invention may also be applied, for example, to the investigation of mixture distribution between the various cylinders of an internal combustion engine. It is known that as the mixture of air and a suitable fuel supplied to a cylinder is weakened from a rich value "knocking" sets in and, after reaching a maximum, decreases again as the mixture is further weakened. In studying mixture distribution, therefore, the mixture strength is gradually reduced and the cylinder which has the weakest mixture will reach maximum "knock", indicated by the apparatus according to the present invention, before the other cylinders. The condition of maximum "knock" will thus be reached by each cylinder in turn in the order in which the mixture strength increases from cylinder to cylinder due to uneven mixture distribution.

It is important that "background" noise, such for example as that introduced due to insufficient smoothing of the power supply to the amplifier, should be kept as low as possible. One advantage of arranging the short-circuiting device at the output end of the amplifier is that the ratio of "background" noise to "wanted" noise is then a minimum because the indicating device only receives energy due to the "background" noise over a fraction of the cycle.

In Figs. 2 and 3 is shown a preferred form of selector or short-circuiting device. Two shafts 25 and 26 are mounted in ball bearings 27 in the casing 28. The two shafts are coupling together by gearing giving a 2 to 1 ratio. Upon the shaft 26 is arranged an insulating drum 29 having a conducting sleeve 30. One half 31 of the conducting sleeve extends around one half only of the surface of the drum whilst the remainder extends all round the drum. Three brushes 32, 33 and 34 are provided, the brush 32 being in continuous contact with the sleeve 30 and being connected to one terminal of the amplifier output, and the other two brushes being connected in parallel and to the other output terminal. The brushes 32 and 33 are carried upon a part 35 which can be rotated relatively to the casing 28 for the purpose of adjusting the point in the rotation of the shafts 25 or 26 at which the short-circuit is broken. The setting of these brushes can be read from an index 36 co-operating with a scale 37 and the part 35 is held in the desired position by a locking nut 38. The brush 34 is carried upon a part 39 which is rotatable relatively to the part 35 and can be clamped thereto by the locking nut 40. The setting of the brush 34 relatively to the part 35 is indicated by index 41 and scale 42 and determines the angle of rotation of the shafts 25 or 26 over which the short-circuit is broken. Neglecting the size of the brushes, when the brushes are in the position shown, this angle is zero and the angle reaches a maximum value of 180° relatively to the shaft 26 when the brush 34 is moved into alignment with the brush 33.

When the selector is coupled to the cam shaft of a 4-stroke internal combustion engine, the shaft 26 is used and when it is coupled to the crank shaft the shaft 25 is used. The stop member 44 can be fastened to a suitable part of the engine frame and serves to hold and to prevent rotation of the selector device.

A noticeable lag is sometimes introduced by the inertia of the diaphragm particularly when investigating high speed machinery and allowance for this may be made if the point in the cycle at which any one maximum of noise occurs is known. Otherwise it may be desirable to reduce the lag to a negligible value for example by using a diaphragm of high natural frequency such for example as a thin tightly stretched metal diaphragm. The diaphragm may conveniently be of aluminum in which case the microphone may be of the "condenser" type.

An amplifier may, if desired, be provided between the rectifier and the indicating device, the amplifier being of the D. C. type, that is to say no coupling transformer or series coupling condenser must be used. The elements 16, 17 which increase the effective time constant of the indicator circuit may then be placed in any suitable position after the rectifier.

One advantage of the method of investigation according to the present invention over known phonometric methods is that since the indicating device is only operative over short spaced time periods, extraneous noises (for example due to other machinery) have a negligible effect on the observations.

We claim:

1. Apparatus for investigating noises and other mechanical vibrations associated with running machinery, comprising an amplifier having an input circuit and an output circuit, a vibration responsive device associated with said input circuit and adapted to generate electrical oscillations in response to vibrations, an indicating device associated with said output circuit and adapted to give a visual indication of the strength of said oscillations and means for periodically short-circuiting and open circuiting said output circuit.

2. Apparatus for investigating noises and other mechanical vibrations associated with running machinery, comprising an amplifier having an input circuit and an output circuit, a vibration responsive device associated with said input circuit and adapted to generate electrical oscillations in response to vibrations, an indicating device associated with said output circuit and adapted to give a visual indication of the strength of said oscillations, means for periodically permitting and preventing said oscillations from said responsive device from influencing said indicating device and associated with said indicating device an electric circuit comprising capacity and resistance adapted to store the indicating current and increase the effective time constant of the circuit of said indicating device.

3. Apparatus for investigating noises and other mechanical vibrations associated with running machinery, comprising a rectifying device having an input circuit and an output circuit, a vibration responsive device adapted to generate electrical oscillations in response to vibrations, means for applying said oscillations to said input circuit, an indicating device, a coupling circuit connected between said rectifying and indicating devices whereby said indicating device is adapted to indicate the strength of the oscillations in said output circuit and in said coupling circuit a resistance and a condenser adapted to store the indicating current and increase the time constant of said coupling circuit.

4. Apparatus according to claim 3 wherein means are provided for adjusting the value of the time constant of said coupling circuit.

5. Apparatus for investigating noises and other mechanical vibrations associated with running machinery, comprising a vibration responsive device adapted to generate electrical oscillations in response to vibrations, an indicating device, a circuit associating said responsive device with said indicating device, means for periodically permitting and preventing said oscillations from influencing said indicating device, and frequency selective means whereby said indicating device is made selectively responsive to oscillations of a predetermined band for frequencies influencing said responsive device.

6. Apparatus according to claim 5, wherein said frequency selective means comprise a diaphragm in said responsive device, said diaphragm being so dimensioned and arranged that it exhibits a peak of response over said band of frequencies.

7. Apparatus for investigating noises and other mechanical vibrations associated with running machinery, comprising a vibration responsive device adapted to generate electrical oscillations in response to vibrations, an indicating device and a circuit associating said responsive device with said indicating device, wherein said indicating device comprises a pivoted member, a stop for said pivoted member, means for urging said pivoted member against said stop and means for adjusting the position of said stop.

8. Apparatus for investigating noises and other mechanical vibrations associated with running machinery, comprising a vibration responsive device adapted to generate electrical oscillations in response to vibrations, an indicating device, a circuit associating said responsive device with said indicating device and a selector device having terminals connected in said circuit, a shaft constituting a part of the machinery under test, means adapted on rotation of said shaft alternately to make and break electrical connection between said terminals and means for adjusting independently the duration of said connections and the phase of making of said connection relative to the position of said shaft.

In testimony whereof we have signed our names to this specification.

RUPERT EVAN HOWARD CARPENTER.
RICHARD STANSFIELD.